United States Patent
Liao

(10) Patent No.: US 7,770,912 B2
(45) Date of Patent: Aug. 10, 2010

(54) FRONT WHEEL FOLDABLE DEVICE FOR GOLF CART

(75) Inventor: Gordon Liao, Yung Kang (TW)

(73) Assignee: Unique Product & Design Co., Ltd., Yung Kang (TW)

( * ) Notice: Subject to any disclaimer, the term of this patent is extended or adjusted under 35 U.S.C. 154(b) by 392 days.

(21) Appl. No.: 11/853,172

(22) Filed: Sep. 11, 2007

(65) Prior Publication Data

US 2009/0066056 A1 Mar. 12, 2009

(51) Int. Cl.
*B62B 3/00* (2006.01)
(52) U.S. Cl. ............... 280/651; 280/DIG. 6; 280/62
(58) Field of Classification Search ............ 280/38, 280/62, 43, DIG. 6, 39, 645, 646, 651, 652, 280/43.18, 43.22
See application file for complete search history.

(56) References Cited

U.S. PATENT DOCUMENTS

| | | | | |
|---|---|---|---|---|
| 3,499,177 A * | 3/1970 | Wolfe | ................ | 114/344 |
| 6,641,228 B2 * | 11/2003 | Liu | ................ | 301/111.06 |
| 6,719,319 B2 * | 4/2004 | Liao | ................ | 280/654 |
| 6,739,616 B2 * | 5/2004 | Lin | ................ | 280/642 |
| 6,811,162 B2 * | 11/2004 | Liao | ................ | 280/47.2 |
| 6,854,551 B2 * | 2/2005 | Wisecarver | ................ | 180/208 |
| 6,863,297 B2 * | 3/2005 | Shapiro | ................ | 280/646 |
| 6,969,078 B2 * | 11/2005 | Liao | ................ | 280/38 |
| 7,000,928 B2 * | 2/2006 | Liao | ................ | 280/38 |
| 7,048,283 B2 * | 5/2006 | Wu | ................ | 280/38 |
| 7,048,296 B1 * | 5/2006 | Wu | ................ | 280/651 |
| 7,137,644 B2 * | 11/2006 | Kimberley | ................ | 280/651 |
| 7,147,242 B2 * | 12/2006 | Wu | ................ | 280/641 |
| 7,543,840 B2 * | 6/2009 | Lin | ................ | 280/639 |
| 2003/0071428 A1 * | 4/2003 | Kang | ................ | 280/62 |
| 2009/0058026 A1 * | 3/2009 | Park et al. | ................ | 280/38 |

* cited by examiner

*Primary Examiner*—Frank B Vanaman
*Assistant Examiner*—Katy Meyer
(74) *Attorney, Agent, or Firm*—Alan Kamrath; Kamrath & Associates PA

(57) ABSTRACT

A front wheel foldable device for a golf cart includes a main body, a wheel frame, a positioning member, a sleeve, a stop member, and an elastic member. Thus, the wheel frame is pulled outwardly relative to the main body so that the locking portions of the positioning member are moved to detach from the locking grooves of the main body respectively. Then, the wheel frame is rotated through ninety (90) degrees and is released, so that the post of the wheel frame is retracted into the main body by a restoring force of the elastic member, the locking portions are locked in the locking grooves respectively, the front wheel is turned from an upright state to a horizontal state, and the front wheel is parallel with and rested on the cart frame when the cart frame is folded.

3 Claims, 10 Drawing Sheets

FRONT WHEEL FOLDABLE DEVICE FOR GOLF CART

BACKGROUND OF THE INVENTION

1. Field of the Invention

The present invention relates to a foldable device and, more particularly, to a front wheel foldable device for a golf cart.

2. Description of the Related Art

A conventional golf cart in accordance with the prior art shown in FIG. 11 comprises a cart frame 2, a front wheel (third wheel) 1 and two rear wheels 10. When the cart frame 2 is folded, the front wheel 1 is perpendicular to the cart frame 2, so that the golf cart has a larger volume when being folded, thereby increasing the volume of package, the costs of transportation and the space of storage. The front wheel 1 can be removed from the cart frame 2 before use to shorten the volume of package so that the user has to mount the front wheel 1 onto the cart frame 2, thereby causing inconvenience to the user in assembly of the front wheel 1 and the cart frame 2.

BRIEF SUMMARY OF THE INVENTION

In accordance with the present invention, there is provided a front wheel foldable device for a golf cart, comprising a main body having a front portion formed with a plurality of locking grooves and a rear portion connected to an articulation mechanism which is connected to a cart frame, a wheel frame having a first portion for mounting a front wheel and a second portion provided with a post which is inserted into the front portion of the main body, a positioning member secured on the post of the wheel frame and inserted into the front portion of the main body, wherein the positioning member is provided with a plurality of locking portions detachably locked in the locking grooves of the main body respectively, a sleeve secured on the post of the wheel frame and inserted into the front portion of the main body, a stop member mounted on the post of the wheel frame and fixed in the main body, and an elastic member mounted on the sleeve and biased between an end head of the sleeve and the stop member. The wheel frame is pulled outwardly relative to the main body so that the locking portions of the positioning member are moved to detach from the locking grooves of the main body respectively. The wheel frame is rotated relative to the main body through ninety (90) degrees and is released, so that the post of the wheel frame is retracted into the main body again by a restoring force of the elastic member, the locking portions of the positioning member are locked in the locking grooves of the main body respectively, the front wheel is turned from an upright state to a horizontal state, and the front wheel is parallel with and rested on the cart frame when the cart frame is folded.

The primary objective of the present invention is to provide a front wheel foldable device for a golf cart, wherein when the wheel frame and the cart frame are folded, the front wheel is parallel with and rested on the cart frame, by changing the angle of the wheel frame so that the front wheel is disposed at the horizontal state to shorten the volume of package, to decrease the costs of transportation and to save the space of storage.

Another objective of the present invention is to provide a front wheel foldable device for a golf cart, wherein the front wheel is parallel with and rested on the cart frame by changing the angle of the wheel frame so that the user needs not to remove the front wheel from the wheel frame before assembly for saving the space of storage so as to reduce the assembly procedures for the user before use.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
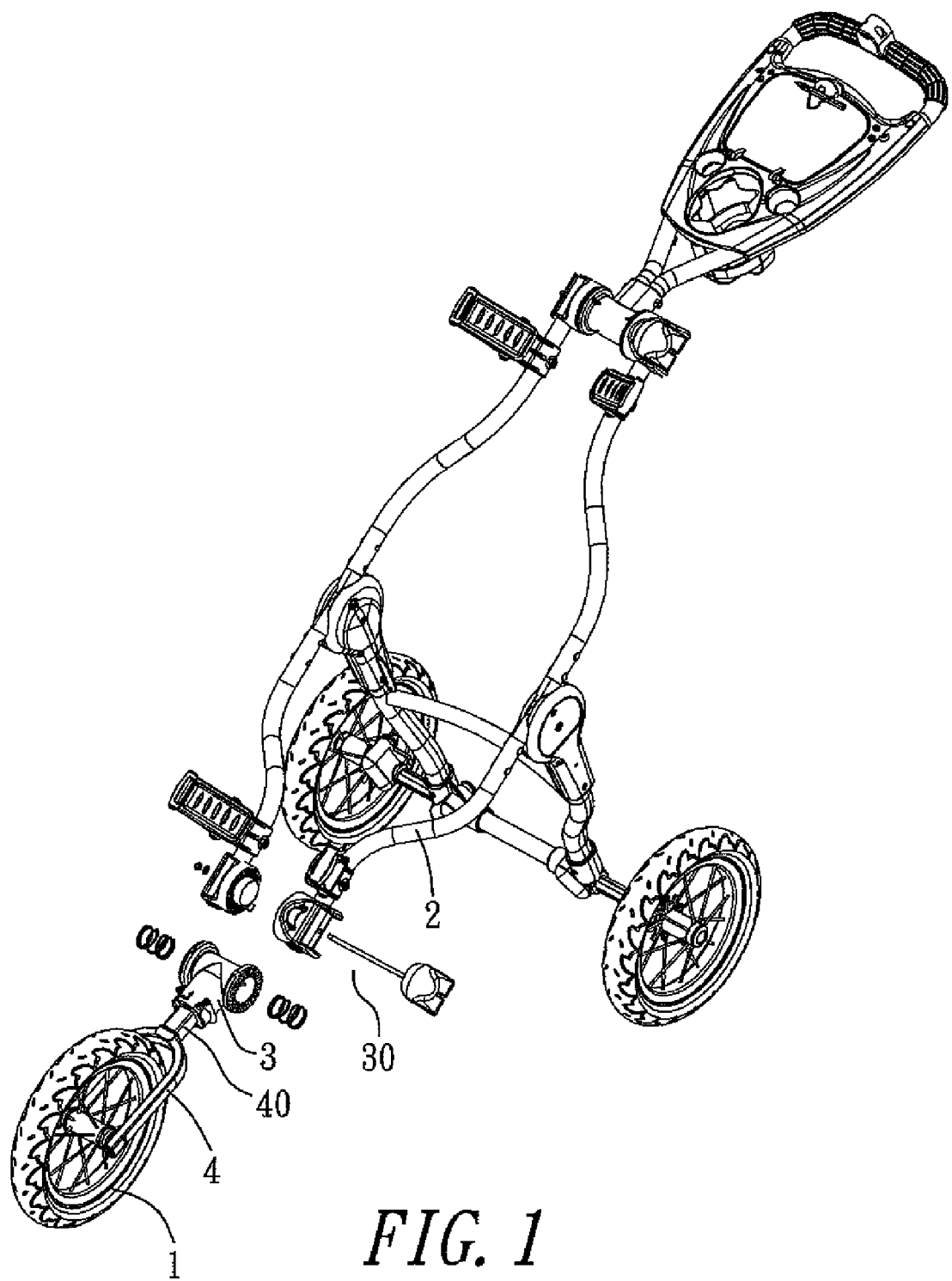
FIG. 1 is an exploded perspective view of a golf cart in accordance with the preferred embodiment of the present invention.

Referring to the drawings and initially to FIGS. 1-5, a front wheel foldable device for a golf cart in accordance with the preferred embodiment of the present invention comprises a main body 3, a wheel frame 4, a stop member 43, and an elastic member 44.

The main body 3 is a hollow T-shaped body. The main body 3 has a tubular front portion formed with a plurality of (preferably four) locking grooves 31 and provided with two opposite fixing seats 32 located at a rear portion of the locking grooves 31. The main body 3 has a tubular rear portion having two opposite sides each provided with a toothed disk 33 for mounting an articulation mechanism 30 which is connected to a cart frame 2. The articulation mechanism 30 is used to connect the cart frame 2 and the wheel frame 4. The articulation mechanism 30 has a conventional structure which is not further described in detail.

The wheel frame 4 has a substantially U-shaped front portion for mounting a front wheel 1 and a rear portion provided with a square post 40 which is inserted into the tubular front portion of the main body 3. A positioning member 41 is secured on the post 40 of the wheel frame 4, and a sleeve 42 is secured on the post 40 of the wheel frame 4. The positioning member 41 is provided with a plurality of (preferably four) locking portions 411 detachably locked in the locking grooves 31 of the main body 3 respectively. The sleeve 42 consists of four pieces each of which has a flat inner wall and an arc-shaped outer wall so that the sleeve 42 has a square inner wall and a circular outer wall. The sleeve 42 has a distal end provided with an enlarged end head.

The stop member 43 is mounted on the sleeve 42 and is fixed in the main body 3 by two fixing members 34. The stop member 43 has two opposite sides each formed with an arc-shaped fixing slot 431 connected to a respective fixing seat 32 of the main body 3. Each of the fixing members 34 is a screw member and extends through a respective fixing seat 32 of the main body 3 and a respective fixing slot 431 of the stop member 43 to fix the stop member 43 in the main body 3.

The elastic member 44 is mounted on the sleeve 42 and is biased between the enlarged end head of the sleeve 42 and the stop member 43.

In assembly, again referring to FIGS. 1-5, the positioning member 41, the sleeve 42, the stop member 43 and the elastic member 44 are mounted on the post 40 of the wheel frame 4, while the post 40 of the wheel frame 4, the positioning member 41, the sleeve 42, the stop member 43 and the elastic member 44 are inserted into the tubular front portion of the main body 3. At this time, the stop member 43 and the main body 3 are fixed without movement, while the post 40 of the wheel frame 4, the positioning member 41 and the sleeve 42 are movable forward and backward with the wheel frame 4. In the preferred embodiment of the present invention, when the front wheel foldable device is disposed at the normal state, the locking portions 411 of the positioning member 41 are locked in the locking grooves 31 of the main body 3 respectively, the elastic member 44 is disposed at an extended state, and the front wheel 1 is disposed at an upright state.

Figure 6:
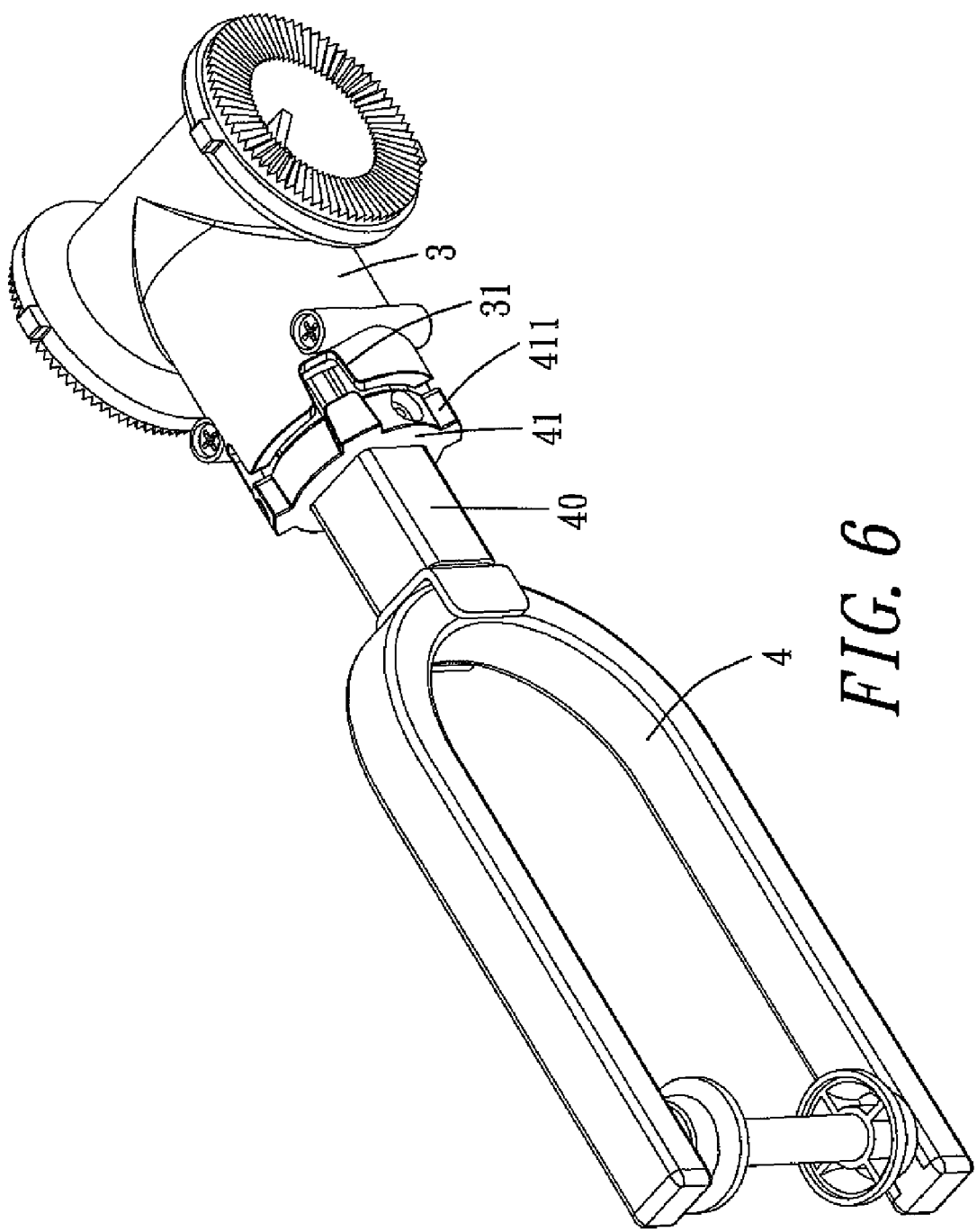
FIG. 6 is a schematic operational view of the front wheel foldable device as shown in FIG. 2.
Figure 7:
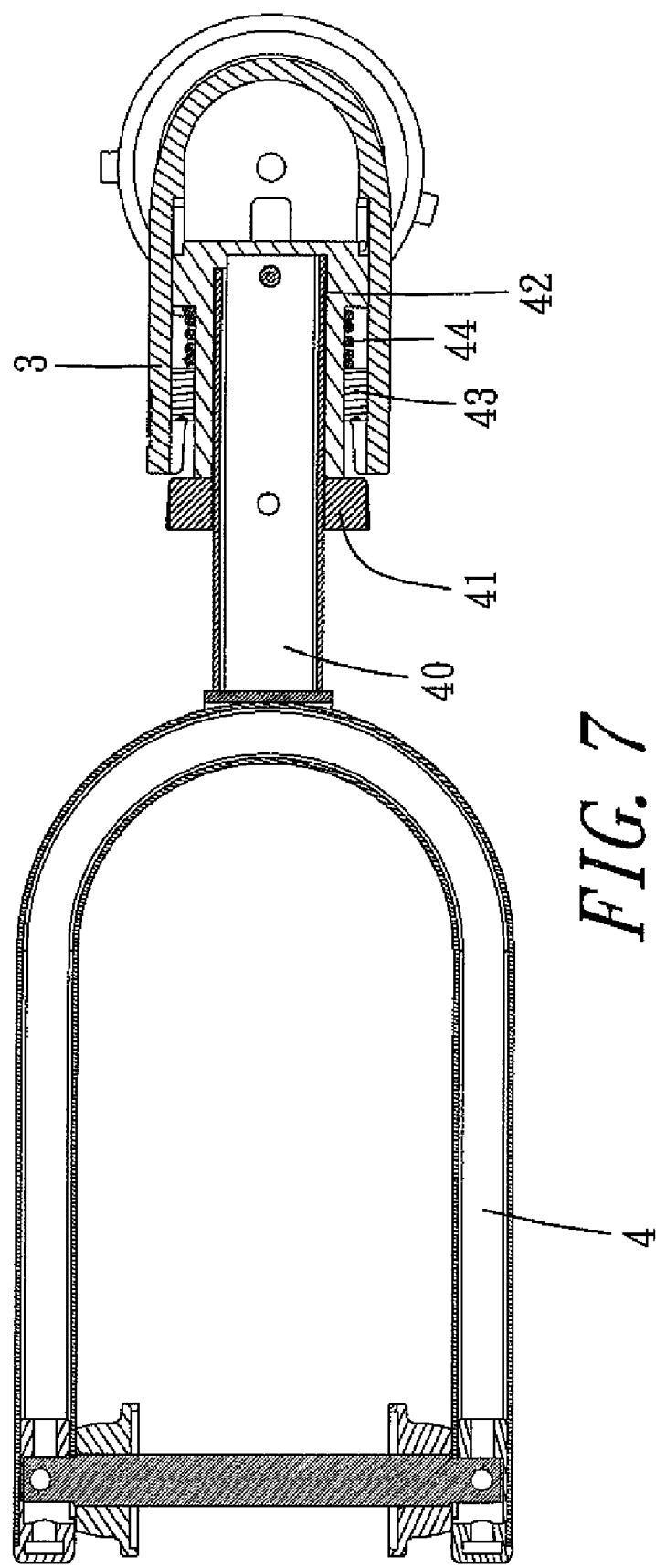
FIG. 7 is a side cross-sectional view of the front wheel foldable device as shown in FIG. 6.
Figure 8:
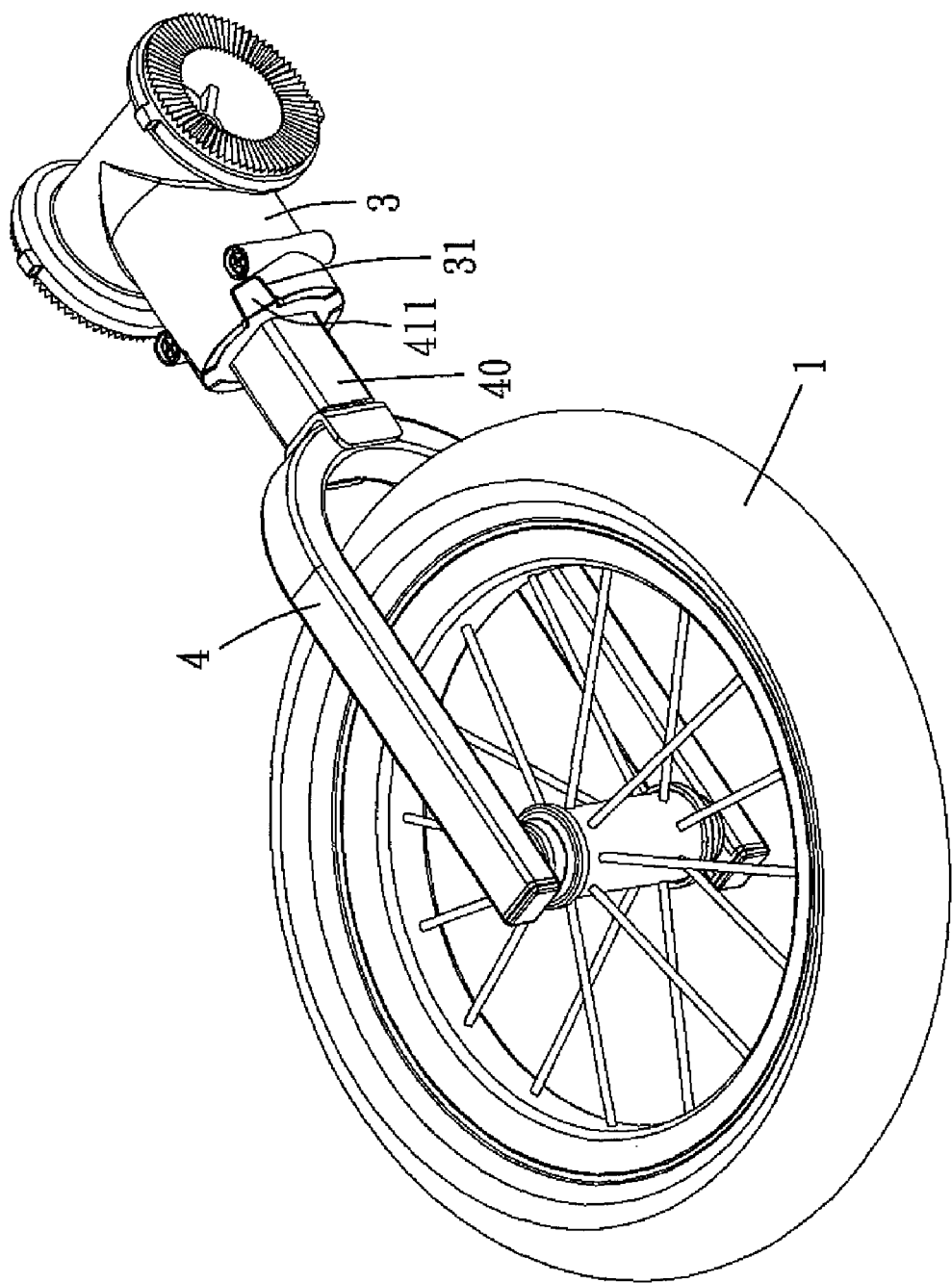
FIG. 8 is a schematic operational view of the front wheel foldable device as shown in FIG. 6.
Figure 9:
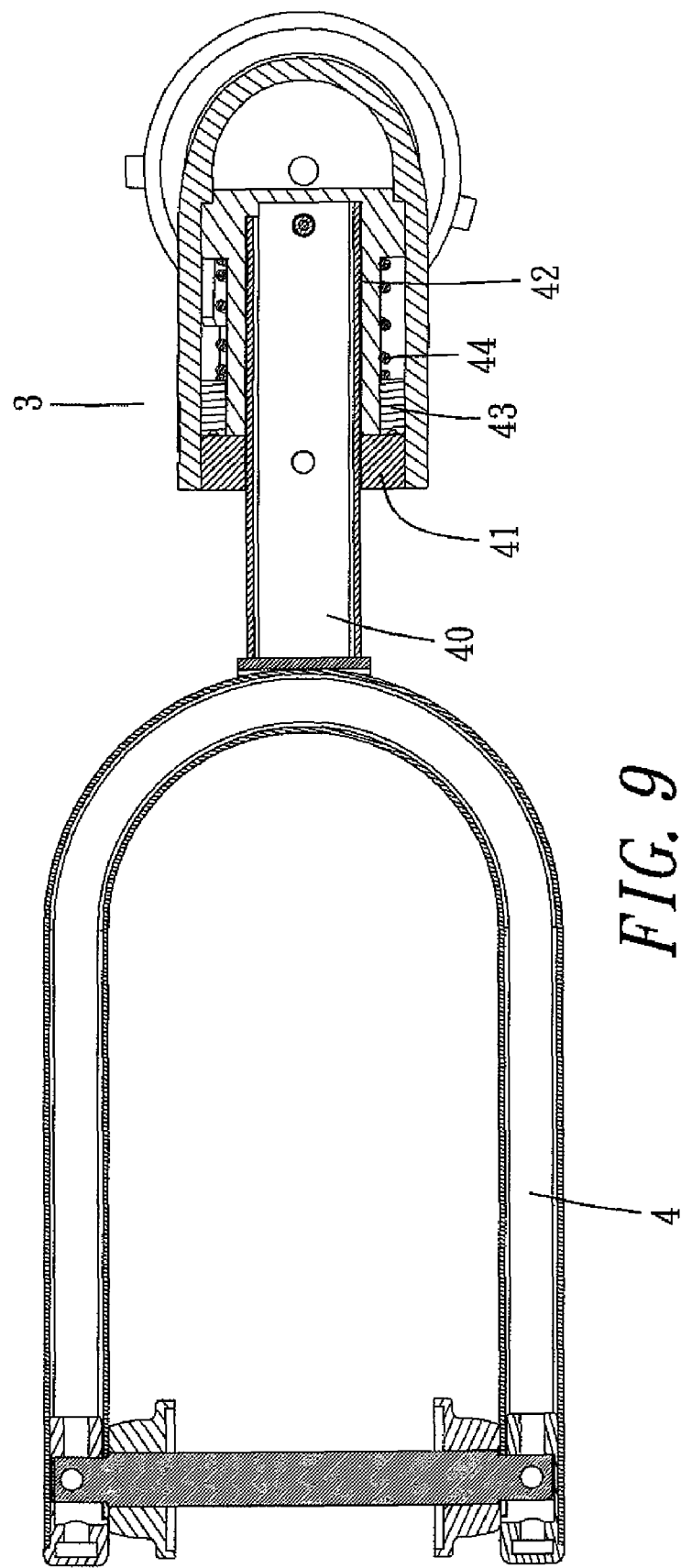
FIG. 9 is a side cross-sectional view of the front wheel foldable device as shown in FIG. 8.
Figure 10:
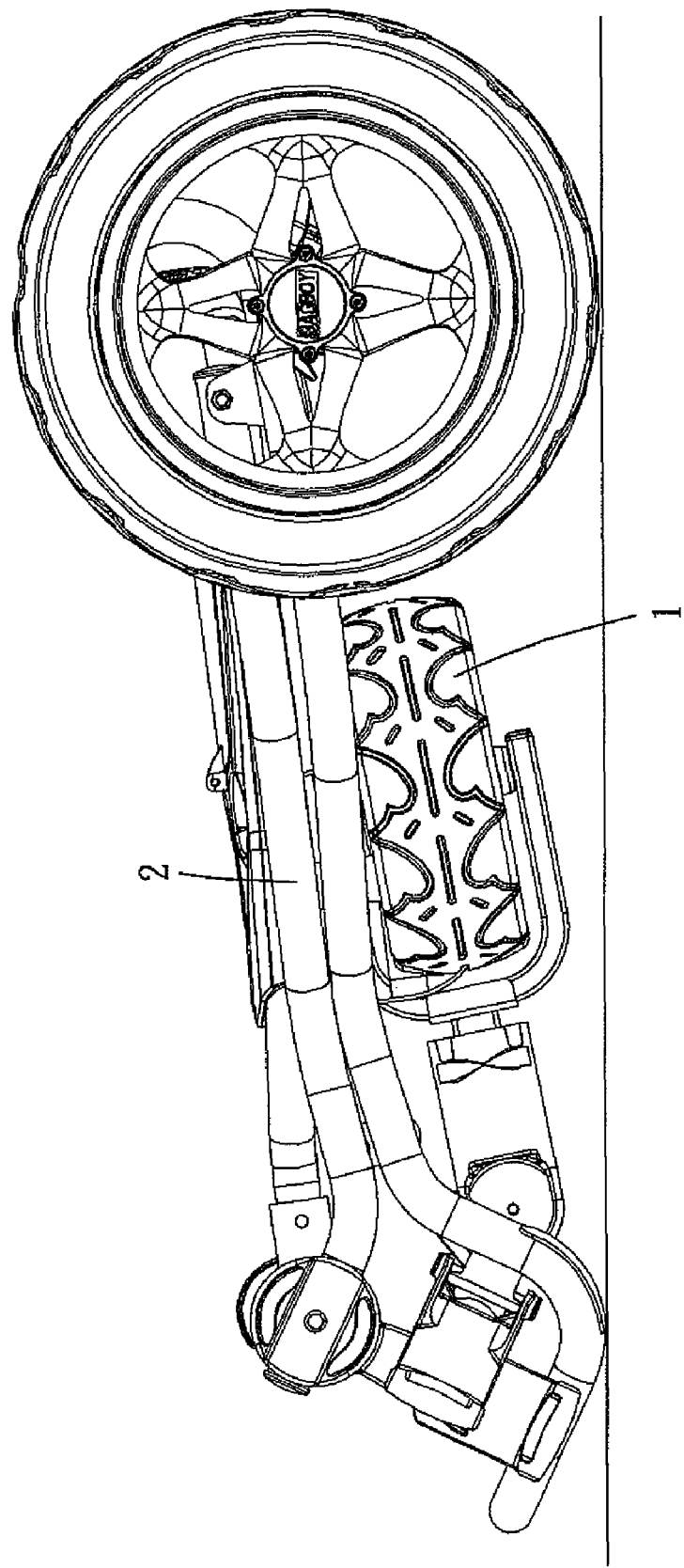
FIG. 10 is a side folded assembly view of the golf cart as shown in FIG. 1.
Figure 11:
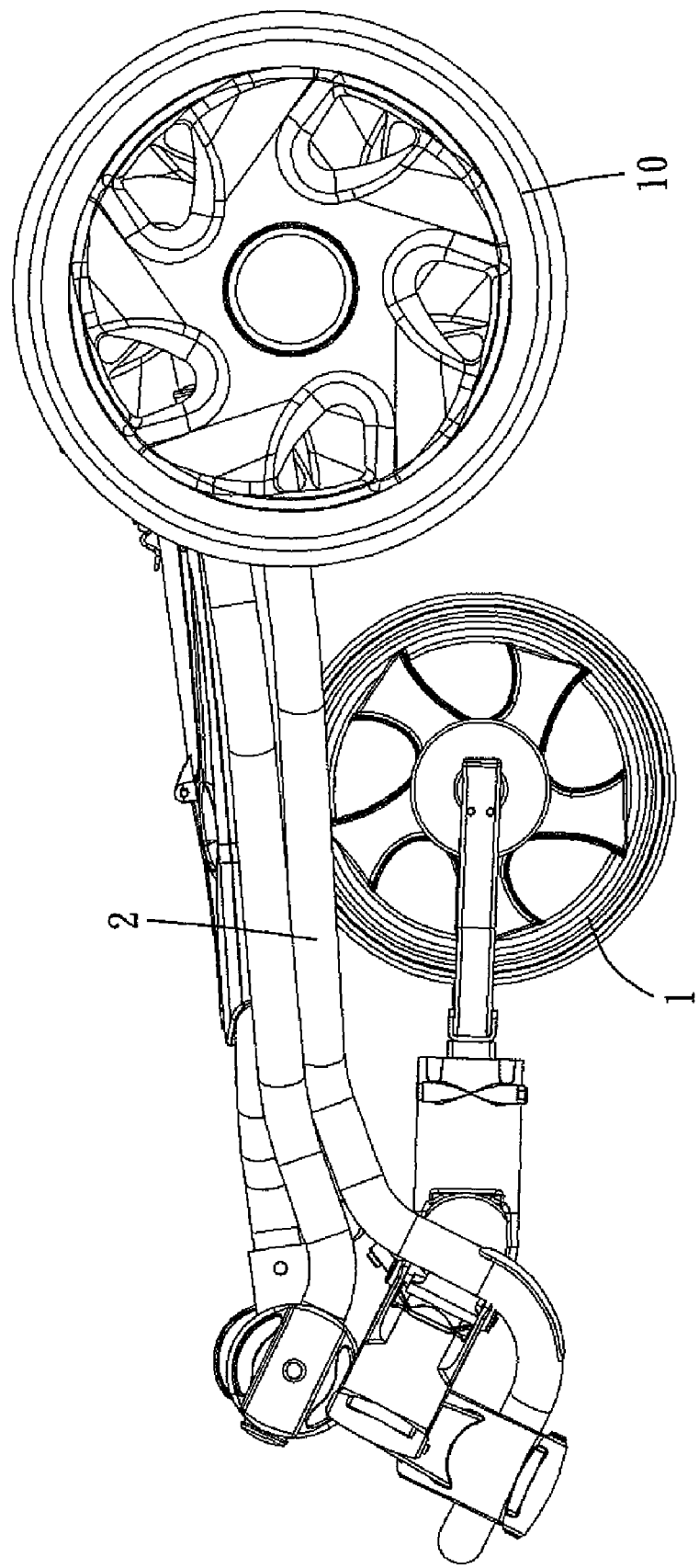
FIG. 11 is a side folded view of a conventional golf cart in accordance with the prior art.

When a user wishes to fold the front wheel foldable device, the wheel frame 4 is pulled outwardly relative to the main body 3 so that the post 40 of the wheel frame 4 is moved to slightly protrude outwardly from the main body 3, the sleeve 42 is moved to compress the elastic member 44, and the locking portions 411 of the positioning member 41 are moved to detach from the locking grooves 31 of the main body 3 respectively as shown in FIGS. 6 and 7. Then, the wheel frame 4 is rotated relative to the main body 3 through ninety (90) degrees so that the front wheel 1 is turned from the upright state to a horizontal state. Then, the wheel frame 4 is released, so that the post 40 of the wheel frame 4 is retracted into the main body 3 again by the restoring force of the elastic member 44, while the locking portions 411 of the positioning member 41 are locked in the locking grooves 31 of the main body 3 respectively as shown in FIGS. 8 and 9. At this time, the front wheel 1 is disposed at the horizontal state. Finally, the front wheel 1 and the wheel frame 4 are folded forward or backward by the articulation mechanism 30, and the cart frame 2 is folded so that the front wheel 1 is parallel with and rested on the cart frame 2 as shown in FIG. 10. Thus, the front wheel 1 is disposed at the horizontal state to shorten the volume of package, to decrease the costs of transportation and to save the space of storage.

Figure 2:
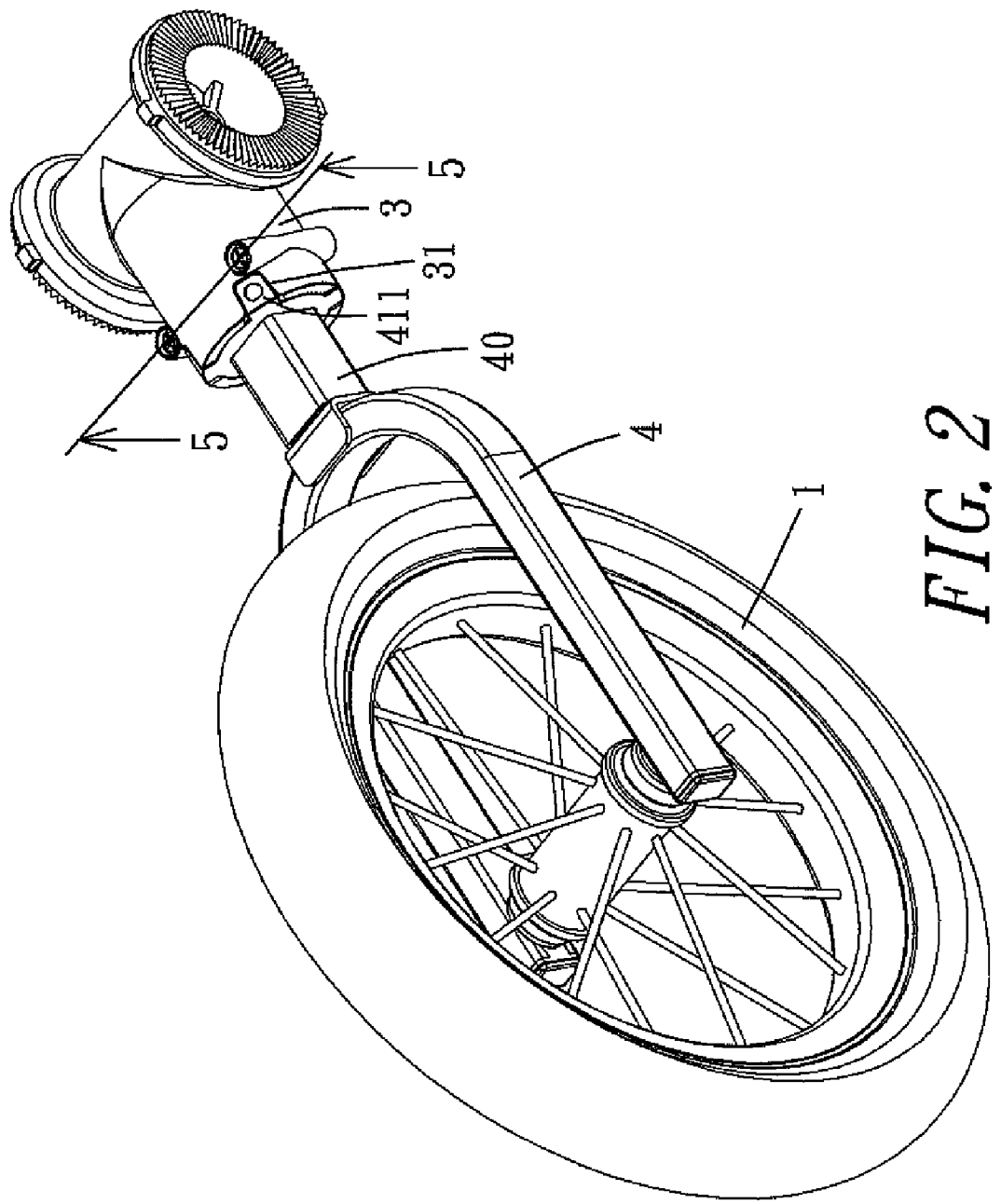
FIG. 2 is a perspective view of a front wheel foldable device for the golf cart in accordance with the preferred embodiment of the present invention.
Figure 3:
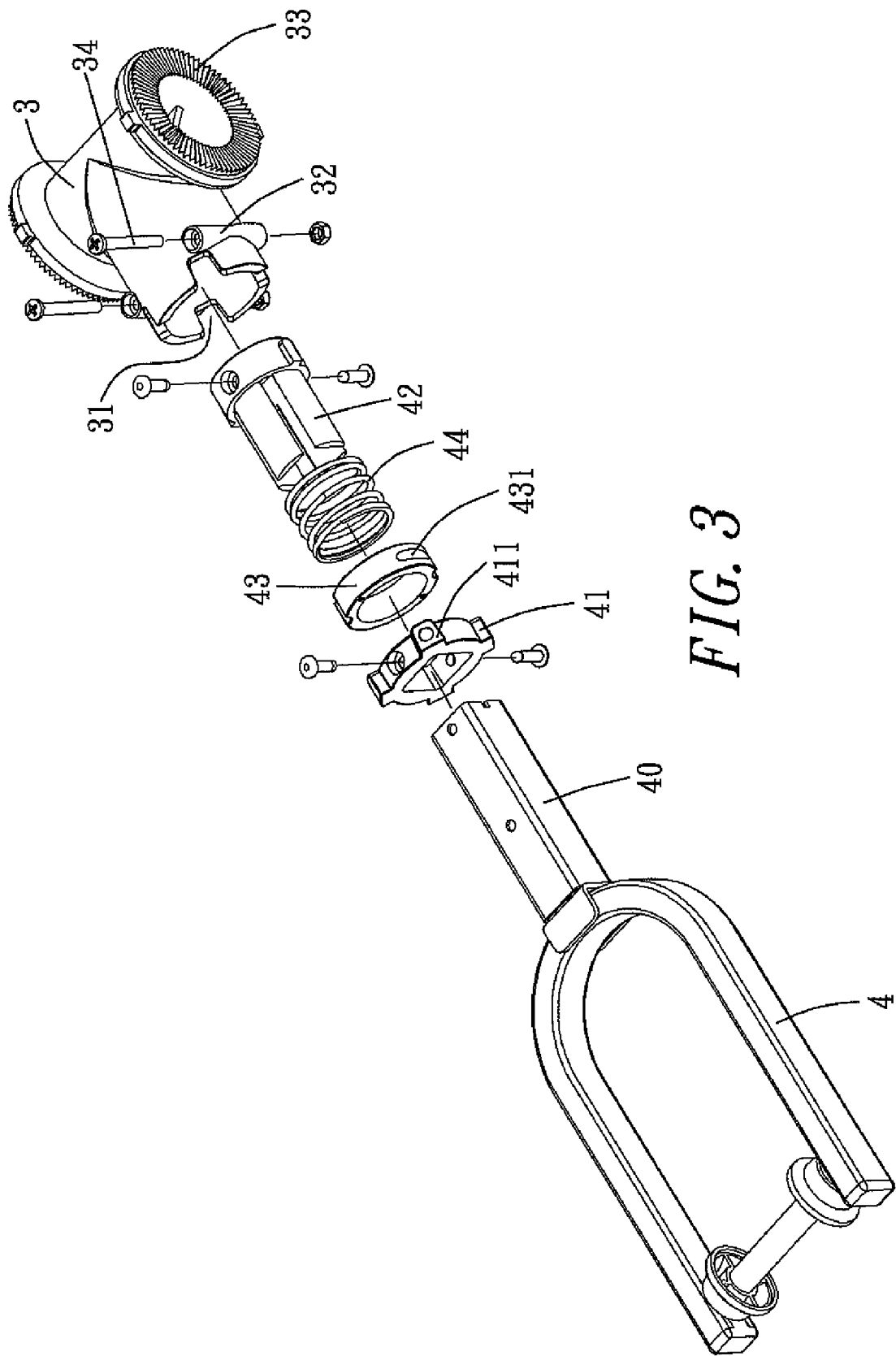
FIG. 3 is an exploded perspective view of the front wheel foldable device as shown in FIG. 2.
Figure 4:
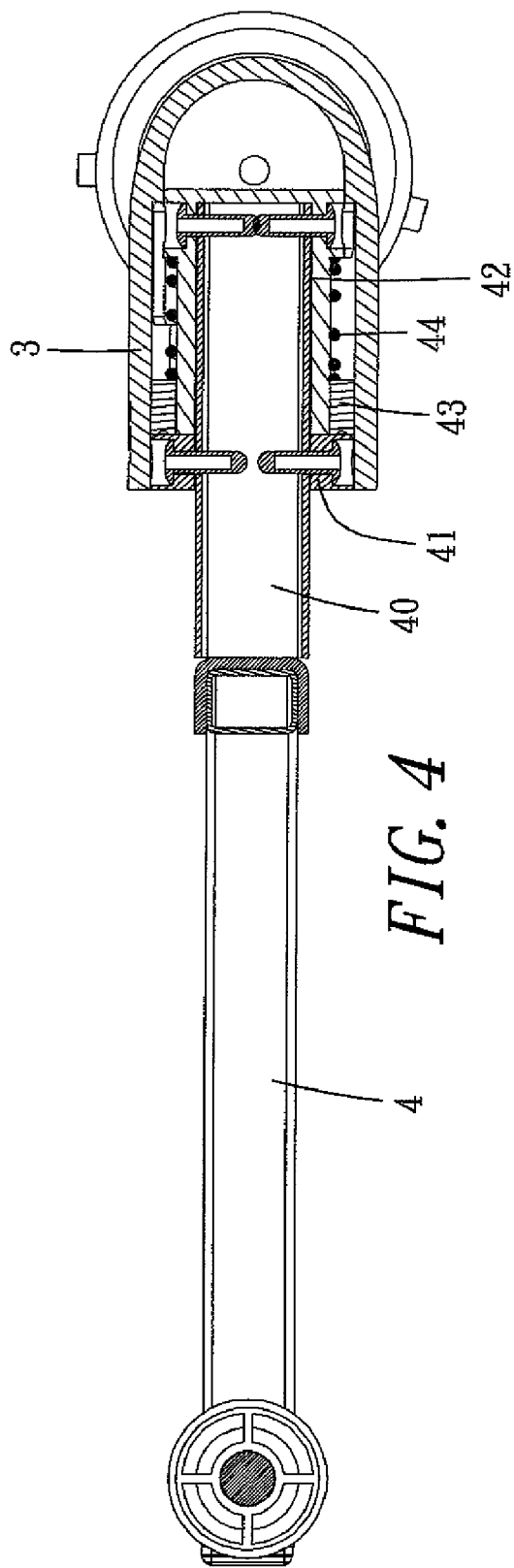
FIG. 4 is a side cross-sectional view of the front wheel foldable device as shown in FIG. 2.
Figure 5:
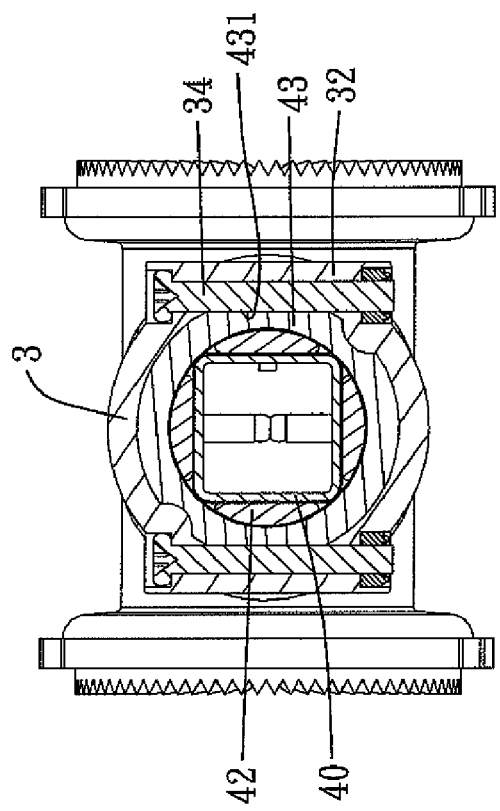
FIG. 5 is a cross-sectional view of the front wheel foldable device taken along line 5-5 as shown in FIG. 2.

When the user wishes to expand the front wheel foldable device, the front wheel 1, the wheel frame 4 and the cart frame 2 are expanded (the operation procedure is similar to that of the conventional front wheel foldable device). Then, the wheel frame 4 is pulled outwardly relative to the main body 3 so that the post 40 of the wheel frame 4 is moved to slightly protrude outwardly from the main body 3, the sleeve 42 is moved to compress the elastic member 44, and the locking portions 411 of the positioning member 41 are moved to detach from the locking grooves 31 of the main body 3 respectively. Then, the wheel frame 4 is rotated relative to the main body 3 through ninety (90) degrees so that the front wheel 1 is turned from the horizontal state to the upright state. Then, the wheel frame 4 is released, so that the post 40 of the wheel frame 4 is retracted into the main body 3 again by the restoring force of the elastic member 44, while the locking portions 411 of the positioning member 41 are locked in the locking grooves 31 of the main body 3 respectively. At this time, the front wheel 1 is disposed at the upright state as shown in FIG. 2.

In conclusion, the angle of the wheel frame 4 is changeable so that the front wheel 1 is disposed at the horizontal state. Thus, when the wheel frame 4 and the cart frame 2 are folded, the front wheel 1 is parallel with and rested on the cart frame 2 so that the front wheel 1 is disposed at the horizontal state to shorten the volume of package, to decrease the costs of transportation and to save the space of storage.

Accordingly, when the wheel frame 4 and the cart frame 2 are folded, the front wheel 1 is parallel with and rested on the cart frame 2 by changing the angle of the wheel frame 4 so that the front wheel 1 is disposed at the horizontal state to shorten the volume of package, to decrease the costs of transportation and to save the space of storage. In addition, the front wheel 1 is parallel with and rested on the cart frame 2 by changing the angle of the wheel frame 4 so that the user needs not to remove the front wheel 1 from the wheel frame 4 before assembly for saving the space of storage so as to reduce the assembly procedures for the user before use.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A front wheel foldable device for a golf cart, comprising:
a main body having a front portion formed with a plurality of locking grooves and a rear portion connected to an articulation mechanism which is connected to a cart frame;
a wheel frame having a first portion for mounting a front wheel and a second portion provided with a post which is inserted into the front portion of the main body;
a positioning member secured on the post of the wheel frame and inserted into the front portion of the main body, wherein the positioning member is provided with a plurality of locking portions detachably locked in the locking grooves of the main body respectively;
a sleeve secured on the post of the wheel frame and inserted into the front portion of the main body;
a stop member mounted on the post of the wheel frame and fixed in the main body;
an elastic member mounted on the sleeve and biased between an end head of the sleeve and the stop member;
wherein when the wheel frame is pulled outwardly relative to the main body, the locking portions of the positioning member are moved to detach from the locking grooves of the main body respectively;
when the wheel frame is then rotated relative to the main body through ninety (90) degrees and is released, the post of the wheel frame is retracted into the main body again by a restoring force of the elastic member, the locking portions of the positioning member are locked in the locking grooves of the main body respectively, the front wheel is turned from an upright state to a horizontal state, and the front wheel is parallel with and rested on the cart frame when the cart frame is folded;
wherein the main body is provided with two opposite fixing seats;
the stop member has two opposite sides each formed with an arc-shaped fixing slot connected to a respective fixing seat of the main body;

the stop member is fixed in the main body by two fixing members; and each of the fixing members extends through a respective fixing seat of the main body and a respective fixing slot of the stop member to fix the stop member in the main body.

2. The front wheel foldable device for a golf cart in accordance with claim 1, wherein the main body has four locking grooves;

the positioning member has four locking portions.

3. The front wheel foldable device for a golf cart in accordance with claim 1, wherein the sleeve consists of four pieces each of which has a flat inner wall and an arc-shaped outer wall so that the sleeve has a square inner wall and a circular outer wall.

\* \* \* \* \*